US009138761B2

(12) United States Patent
Ritchie

(10) Patent No.: US 9,138,761 B2
(45) Date of Patent: Sep. 22, 2015

(54) INTERMIXING ASSEMBLY EVAPORATIVE AIR CONDITIONER SYSTEM

(71) Applicant: Michael Charles Ritchie, Las Vegas, NV (US)

(72) Inventor: Michael Charles Ritchie, Las Vegas, NV (US)

(73) Assignee: Coolfactor, LLC, Las Vegas, NV (US)

( * ) Notice: Subject to any disclaimer, the term of this patent is extended or adjusted under 35 U.S.C. 154(b) by 421 days.

(21) Appl. No.: 13/661,709

(22) Filed: Nov. 28, 2012

(65) Prior Publication Data
US 2014/0145012 A1    May 29, 2014

(51) Int. Cl.
| B05B 7/04 | (2006.01) |
| B05B 7/06 | (2006.01) |
| B05B 1/34 | (2006.01) |
| F24F 5/00 | (2006.01) |
| F24F 6/14 | (2006.01) |
| F28F 27/00 | (2006.01) |
| F28D 5/00 | (2006.01) |

(52) U.S. Cl.
CPC .............. *B05B 7/066* (2013.01); *B05B 1/3415* (2013.01); *B05B 7/0483* (2013.01); *F24F 5/0035* (2013.01); *F24F 6/14* (2013.01); *F28D 5/00* (2013.01); *F28F 27/00* (2013.01); *F24F 2006/143* (2013.01); *Y02B 30/545* (2013.01)

(58) Field of Classification Search
CPC .. B05B 1/3415; B05B 1/3421; B05B 1/3463; B05B 7/066; B05B 7/0815; B05B 7/10; F24F 1/42; F24F 5/0035; F24F 2013/227; F25B 2339/021
See application file for complete search history.

(56) References Cited

U.S. PATENT DOCUMENTS

| 3,799,249 | A | * | 3/1974 | Linhardt ........................ 165/60 |
| 4,287,938 | A | * | 9/1981 | Lagerquist et al. ...... 165/104.25 |
| 4,360,368 | A |   | 11/1982 | Lyon |
| 4,380,491 | A | * | 4/1983 | Joy et al. ...................... 159/4.01 |
| 4,443,389 | A | * | 4/1984 | Dodds .......................... 261/153 |
| 5,449,288 | A | * | 9/1995 | Bass ............................. 431/330 |
| 6,598,801 | B1 | * | 7/2003 | Fortuna et al. .................... 239/8 |
| 6,766,655 | B1 | * | 7/2004 | Wu .................................. 62/305 |
| 6,823,684 | B2 |   | 11/2004 | Jensen |
| 2003/0155434 | A1 | * | 8/2003 | Rini et al. ..................... 239/398 |

FOREIGN PATENT DOCUMENTS

| CN | 1912490 A | 2/2007 |
| JP | 2009115335 A | 5/2009 |
| RU | 2056591 C1 | 3/1996 |
| RU | 2391142 C1 | 6/2010 |

OTHER PUBLICATIONS

International Search Report and Written Opinion; dated Feb. 20, 2014.

* cited by examiner

*Primary Examiner* — Ryan Reis
(74) *Attorney, Agent, or Firm* — Hovey Williams LLP

(57) ABSTRACT

An intermixing assembly for an evaporative air conditioner includes an elongated housing and a nozzle positioned in the housing. The housing has an inlet for receiving ambient air from a source thereof and an outlet. The nozzle is positioned adjacent the housing outlet and has a first inlet for connecting to a source of pressurized water; a second inlet for connecting to a source of pressurized air; and an outlet for dispensing the pressurized water and pressurized air and mixing them with the ambient air to form a mist near the housing outlet.

8 Claims, 13 Drawing Sheets

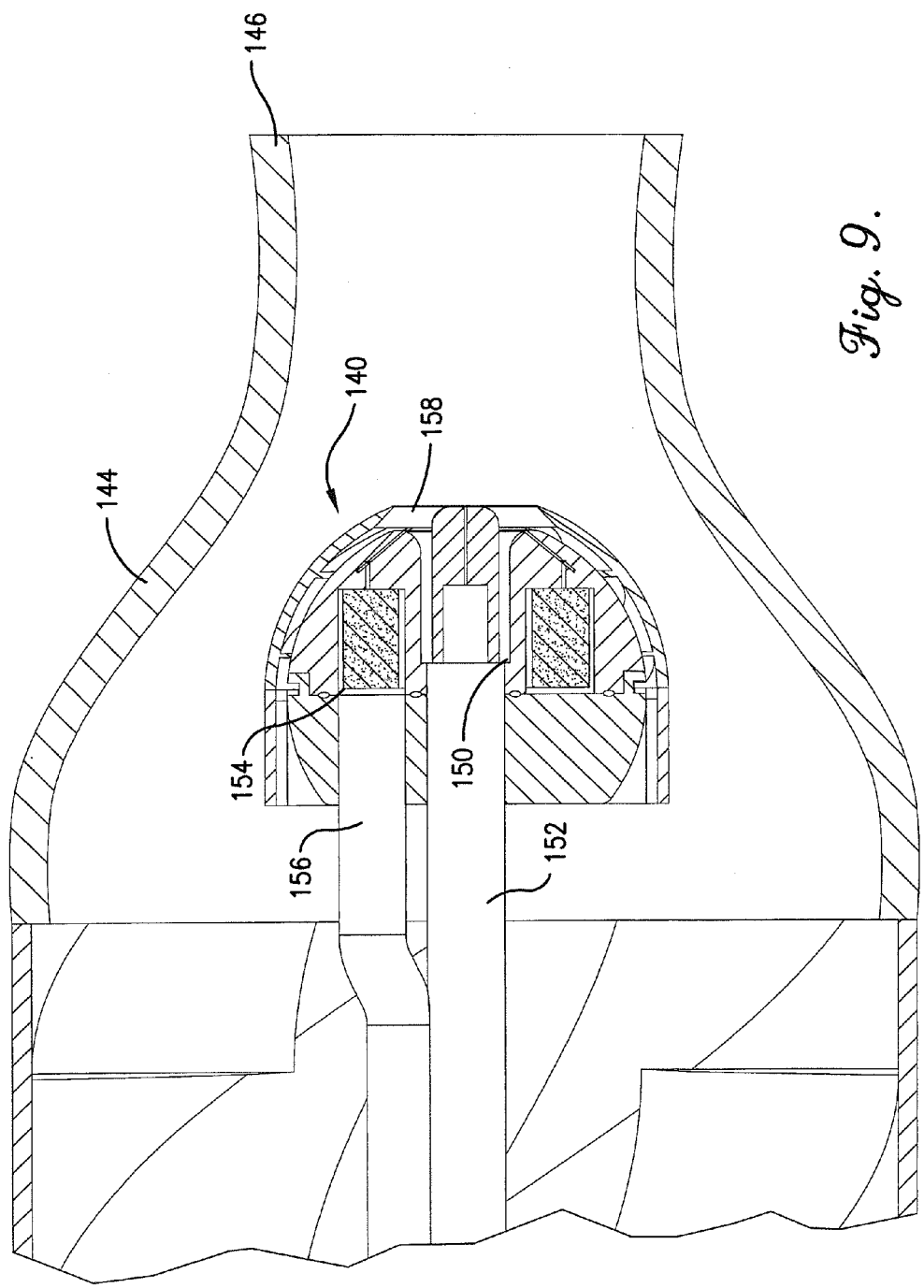

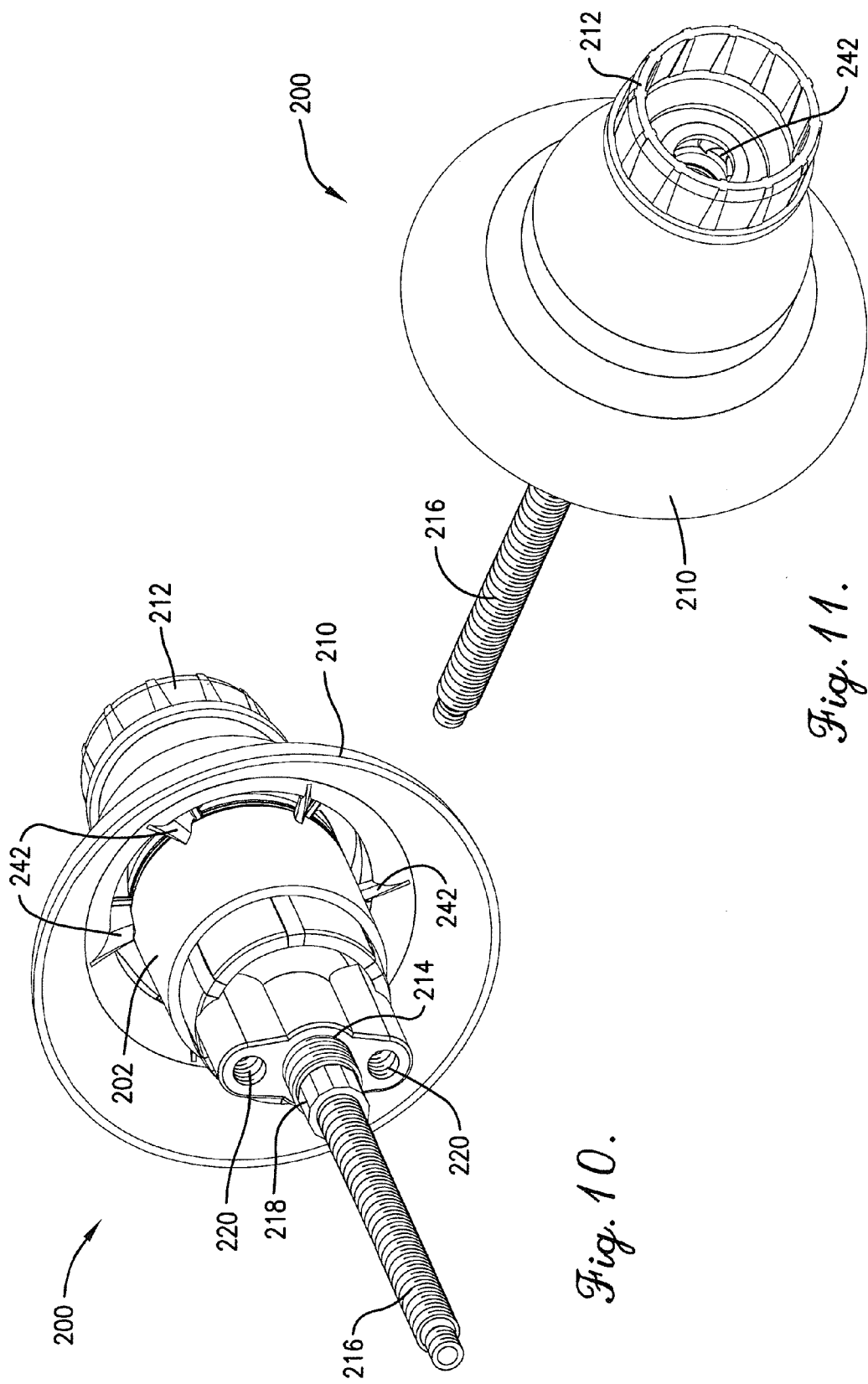

INTERMIXING ASSEMBLY EVAPORATIVE AIR CONDITIONER SYSTEM

BACKGROUND

The present invention relates to air conditioning systems. More particularly, the invention relates to an improved evaporative type air conditioning system with a unique intermixing assembly.

Most air conditioning systems use vapor-compression or absorption refrigeration cycles. Although such air conditioning systems are effective at cooling, they use a great deal of energy.

Evaporative type air conditioning systems cool air, liquids, or other mediums with much less energy than vapor-compression and absorption refrigeration systems. Evaporative cooling works by employing water's large enthalpy of vaporization. The temperature of air, especially when dry, can be dropped significantly through phase transition of water from a liquid to a vapor. In dry climates, evaporative cooling also has the added benefit of adding humidity to the conditioned air.

A typical evaporative air conditioner has a water pump that applies water to one or more evaporative cooling pads and a fan or blower that blows ambient air over the pads. The air evaporates the water in the pads and thus removes heat from the air through evaporative cooling. The cool moist air is then delivered to a building or other conditioned space through vents and/or duct work.

Although evaporative air conditioners use less energy than vapor-compression/absorption type systems, they suffer from several distinct disadvantages. For example, evaporative air conditioners often introduce too much humidity into a building, which can be uncomfortable and cause walls, doors, and furniture to swell and metal components to corrode.

Evaporative air conditioners also require large volumes of air to be introduced into a conditioned space, thus requiring equal amounts of air inside the conditioned space to be vented out. This creates drafts and introduces dust and other particles into the space. Air passed over the evaporative pads can be recirculated from inside the building to reduce the required amount of outside air, but air is ideally only allowed to pass through the evaporative pads once because the air loses its cooling effect as it becomes saturated with water (dry air evaporates water more quickly than damp air).

Evaporative cooling can also introduce odors into a conditioned space because the evaporative pads often promote the growth of mold, mildew, and/or bacteria. The fans necessary for the constant exchange of air within the conditioned space can also create excessive fan noise and vibrations.

Indirect evaporative air conditioner systems solve some of the above-described problems by utilizing heat exchangers so that the cooled, moist air never comes into direct contact with the conditioned space. However, known indirect evaporative systems require a great deal of water and are not efficient nor practical in areas of high humidity.

SUMMARY

The present invention solves the above-described problems and provides a distinct advance in the art of evaporative type air conditioning systems. More particularly, the present invention provides an improved evaporative type air conditioning system that does not introduce excessive humidity into a conditioned space; is not susceptible to mold, mildew, and/or bacteria growth; does not introduce excessive outdoor air into the conditioned space; and is more efficient and effective than existing indirect evaporative air conditioning systems.

The present invention provides improved evaporative cooling with a technology called "Accelerated Hyper-Evaporation". As described in more detail below, Accelerated Hyper-Evaporation creates a dense mist of microscopic water droplets suspended in air then rapidly draws or forces the mist and ambient air through a metal heat exchanger under the influence of pressurized air or a vacuum source. This causes water in the mist to rapidly evaporate and cool the heat exchanger so the heat exchanger can cool air or any other medium passed over or through the heat exchanger.

An evaporative air conditioner system constructed in accordance with one exemplary embodiment of the invention broadly comprises: a heat exchanger; a pump and nozzle assembly; an air vent; a pressured air blower and/or a vacuum assembly; a transfer mechanism; and a control system. The system may include other components that are described in the Detailed Description section of the application below.

The heat exchanger removes heat from air delivered to the conditioned space and isolates the air from the water used for evaporative cooling to prevent humidity from being added to the conditioned space. An embodiment of the heat exchanger has an inlet, an outlet, and a plurality of passageways between the inlet and the outlet. The passageways are preferably formed from metal tubes that do not promote mold, mildew, and bacteria growth. The heat exchanger may be an air-to-vapor (ATV) type heat exchanger or a liquid-to-vapor (LTV) type heat exchanger.

The pump and nozzle assembly provides the air and water used to cool the heat exchanger through evaporative cooling. In one embodiment, the assembly introduces and mixes pressurized air and water at the inlet of the heat exchanger to create a mist of water droplets suspended in air. The pump and nozzle assembly may comprise one or more high pressure water nozzles and a water pump for delivering water at 400-50,000 psi to the water nozzles and one or more high pressure air nozzles and an air pump or other source of pressurized air for delivering pressurized air at 25-1,000 psi to the air nozzles.

The air vent introduces pressurized or non-pressurized ambient air to the inlet of the heat exchanger for mixing with the mist from the pump and nozzle assembly. The amount of ambient air drawn into the heat exchanger may be regulated by a motor driven damper.

The vacuum assembly creates a partial vacuum near the outlet of the heat exchanger to rapidly draw the mist and ambient air through the heat exchanger and/or a blower may force ambient air into the inlet. This removes heat from the heat exchanger through evaporative cooling.

The transfer mechanism moves air, liquid, or any other medium over or through the heat exchanger to cool the air or other medium. The cooled air or other medium is then used to cool a conditioned space served by the air conditioner. Importantly, the transfer mechanism and heat exchanger do not permit the air or other medium used to cool the conditioned space to mix with the mist drawn through the heat exchanger so no humidity is added to the air delivered to the conditioned space.

The control system operates the components of the air conditioner to optimize the performance and efficiency of the air conditioner. In some embodiments, the control system may operate the air conditioner in a number of stages. For example, in one embodiment, the control system operates the air conditioner in a first stage when ambient temperatures are below a threshold temperature and a second stage when ambient temperatures are above the threshold temperature. In the second stage, the high pressure air nozzle may be activated to provide maximum cooling. In the first stage, the air nozzle may be turned off when less cooling is required. In another embodiment, the control system operates the air conditioner in four stages, including: $1^{st}$ stage—low pressure (variable) water, low speed (variable) vacuum and/or blower; $2^{nd}$ stage—medium pressure (variable) water, medium speed (variable) vacuum and/or blower; $3^{rd}$ stage—high pressure (variable water, high pressure (variable) vacuum and/or blower; and $4^{th}$ stage—high pressure (variable) water, high pressure (variable) vacuum and/or blower, compressed air.

The above described evaporative air conditioner system provides numerous advantages over existing air conditioner systems. For example, the air conditioner does not introduce excessive humidity into the conditioned space; is not susceptible to mold, mildew, and/or bacteria growth; and does not introduce excessive outdoor air into the conditioned space. The air conditioner system of the present invention also allows the conditioned air to be recirculated from within the conditioned space and filtered, purified, sterilized, humidified, and/or zoned.

The air conditioner of the present invention is also more efficient and effective than existing indirect evaporative air conditioning systems. For example, by mixing ambient air, pressurized air, and pressurized water at the inlet of the heat exchanger, the pump and nozzle assembly creates a dense atomized mist that can be evaporated more quickly than water soaked in an evaporative pad. Then, by rapidly drawing the mist through the heat exchanger under optional pressured air blower and/or vacuum pressure, a large volume of the mist quickly evaporates to rapidly remove heat from the heat exchanger at a significantly faster rate than evaporation in conventional evaporative type air conditioners.

An evaporative air conditioner system constructed in accordance with another embodiment of the invention employs liquid-to-vapor (LTV) type heat exchanger technology so that it can be self-contained and/or used in a zoned air conditioning application. The air conditioner system of this embodiment broadly comprises a heat exchanger, an intermixing assembly, an air vent, a pressured air and/or vacuum system, and a control system.

The heat exchanger removes heat from a liquid or other cooling medium that is in turn used to chill an internal heat exchanger or one or more remote heat exchangers. An embodiment of the heat exchanger broadly comprises a housing and a heat transfer coil positioned in the housing. The housing is elongated and generally hollow and has a first generally horizontally-extending section and a second generally vertically-extending section. A perforated support tube is positioned primarily in the first section and has an inlet for receiving water and air from the intermixing assembly and a series of holes for balancing or expelling the water and air therefrom. The heat transfer coil is wound around the perforated support tube and is cooled through evaporative cooling by the water and air discharged from the perforated support tube.

In some embodiments, the first housing section includes an inner wall for enclosing the perforated support tube and the heat transfer coil and an outer wall spaced from and encircling the inner wall to provide an insulative air gap between the inner wall and outer wall. The housing may further have an elbow section joining the first housing section and the second housing section. A condensation reservoir may be positioned in the elbow for collecting water that condenses from the air and for delivering the water back to the water source.

The intermixing assembly supplies the water and air used to cool the heat exchanger and broadly comprises a housing and a nozzle positioned within the housing. The housing has an inlet for receiving ambient air from the air vent and an outlet with an inwardly tapered neck for coupling with the perforated support tube of the heat exchanger. A plurality of spiral vanes may be positioned within the housing for creating turbulence in the ambient air as it passes through the housing.

The nozzle is positioned adjacent the housing outlet and has a first inlet for connecting to a source of pressurized water; a second inlet for connecting to a source of pressurized air; and an outlet for dispensing the pressurized water and the pressurized air. The configuration of the nozzle and the housing mixes the pressurized water, the pressurized air, and the ambient air to form a dense mist of tiny water droplets suspended in air near the outlet of the intermixing assembly for delivery to the heat exchanger.

The air vent introduces pressured and/or non-pressurized ambient air to the housing inlet. The air vent may be positioned anywhere and may be connected to duct work, hoses, etc. that draw ambient air from an outside area. The air vent may also be coupled to a motorized damper for regulating the amount of ambient air introduced in the inlet area.

The vacuum and/or forced air blower is coupled with the open end of the second housing section for rapidly forcing and/or drawing the water and air from the intermixing assembly, through the perforated support tube, over the heat transfer coil, and out the second housing section. The rapid transfer of the dense mist of water droplets over the heat transfer coil more quickly cools the heat transfer coil through evaporative cooling.

The control system is similar to that one described above and may control various pumps, motors, and/or valves to optimize the performance and efficiency of the air conditioner.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 9 is an enlarged vertical sectional view of a portion of the intermixing assembly.

FIG. 10 is a rear perspective view of an alternative embodiment of the nozzle.

FIG. 11 is a front perspective view of the nozzle of FIG. 10.

Figure 1:
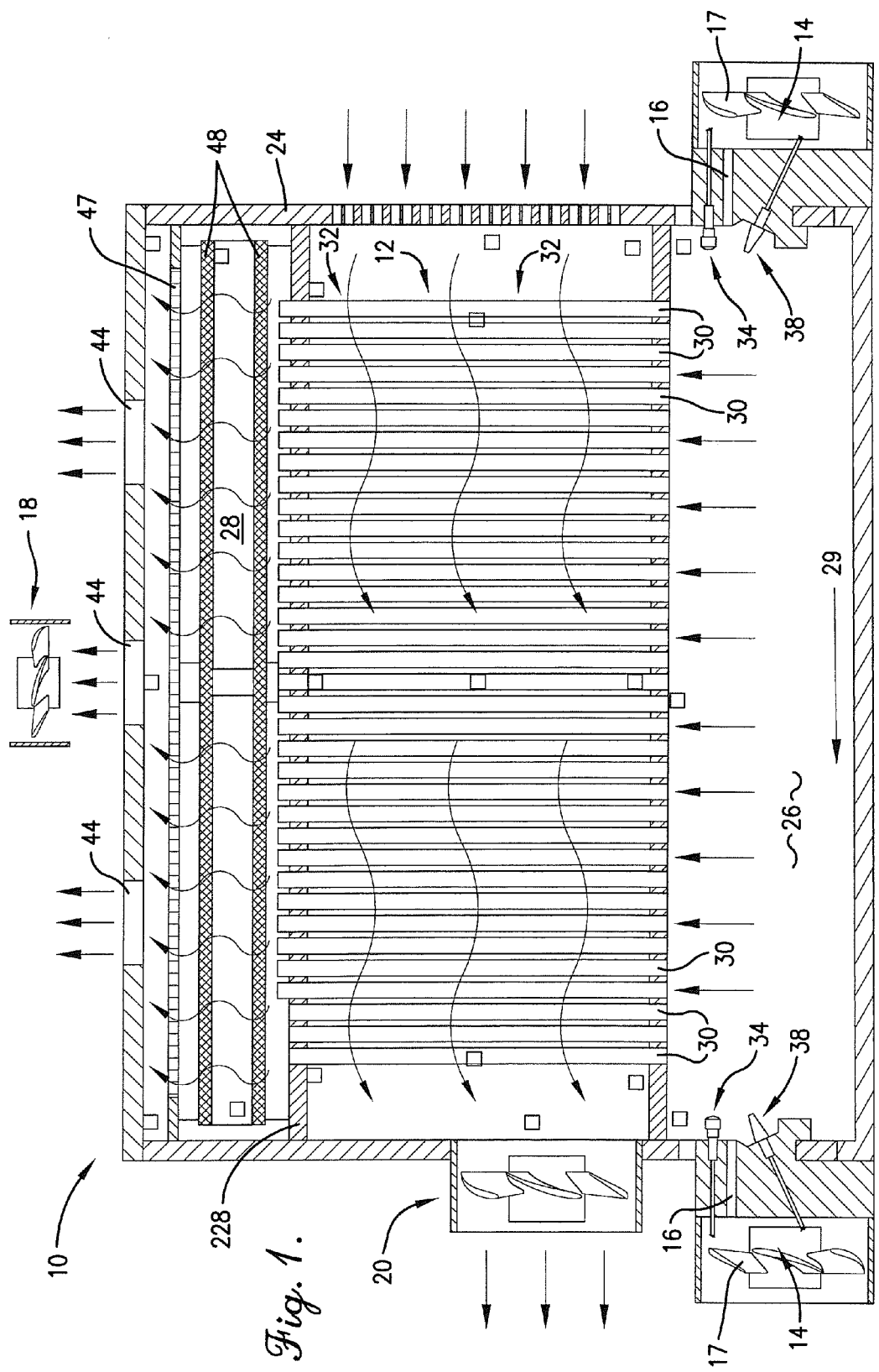
FIG. 1 is a schematic diagram of components of an air conditioner system constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, an evaporative air conditioner system 10 constructed in accordance with an embodiment of the invention is illustrated. The air conditioner system 10 cools air via advanced evaporative cooling techniques and may be used to cool a house, office building, or any other conditioned space. The air conditioner system 10 employs a technology invented by the applicant called "Accelerated Hyper-Evaporation". Accelerated Hyper-Evaporation creates a dense mist of microscopic water droplets suspended in air then rapidly forces and/or draws the mist and ambient air through a metal heat exchanger under the influence of pressured air or a vacuum source. This causes water in the mist to rapidly evaporate and cool the heat exchanger so the heat exchanger can in turn chill air or any other medium passed over or through the heat exchanger (depending whether it's an air-to-vapor (ATV) or liquid-to-vapor (LTV) heat exchanger).

Figure 2:
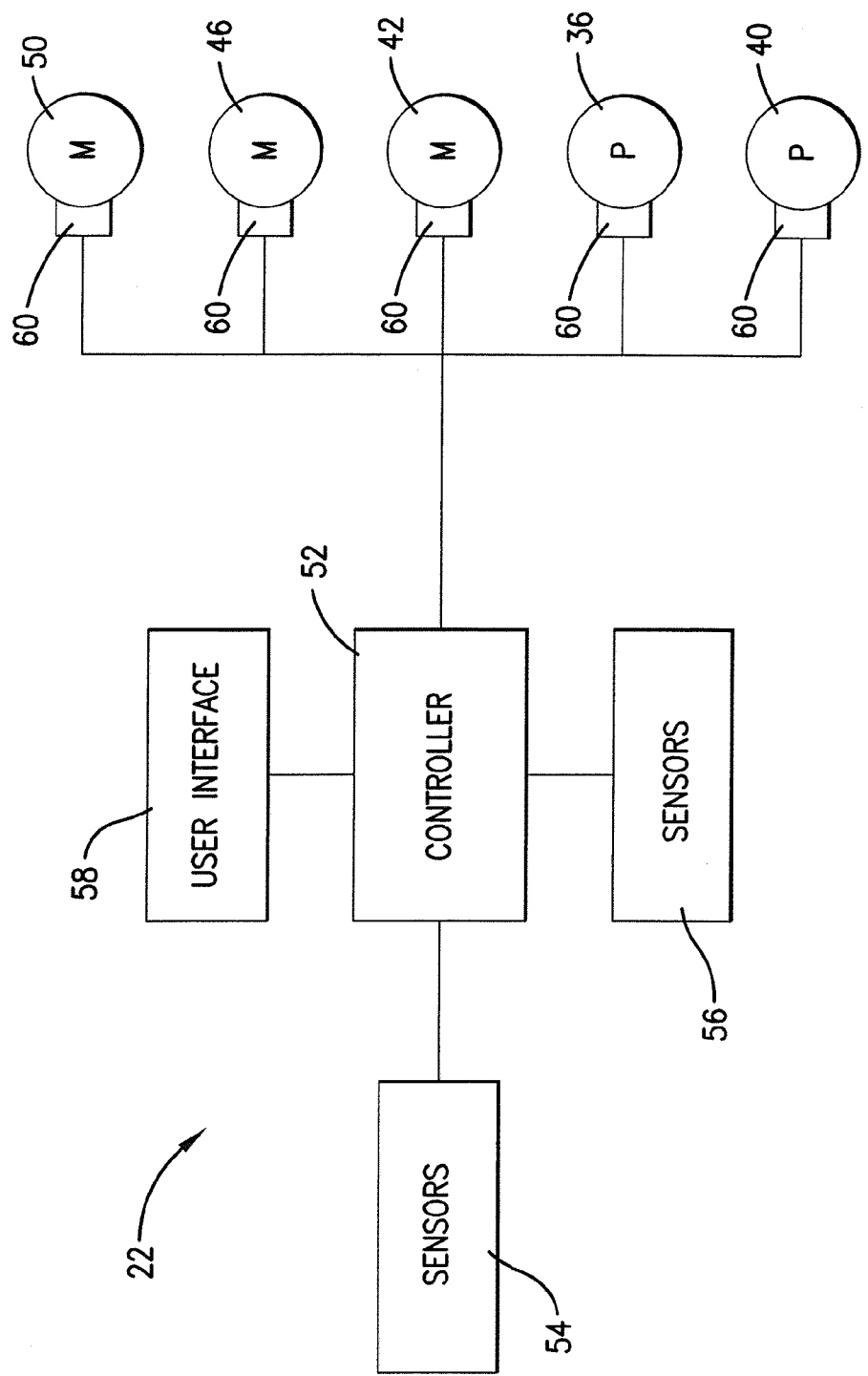
FIG. 2 is a block diagram of components of the control system of the air conditioner system.

As shown primarily in FIG. 1, an air conditioner system 10 constructed in accordance with an exemplary embodiment of the invention broadly comprises: a heat exchanger 12; a pump and nozzle assembly 14; an air vent 16; optional pressured air blower 17, a vacuum assembly 18; and a transfer mechanism 20. As shown in FIG. 2, the system 10 also includes a control system 22.

The heat exchanger 12 isolates water used for evaporative cooling from the conditioned air introduced into the conditioned space as is conventional in indirect evaporative air conditioner systems. The heat exchanger 12 and other components of the air conditioner may be enclosed within a cabinet, housing, or other enclosure 24. The enclosure 24 defines an inlet area 26 on one side of the heat exchanger 12 and an outlet area 28 on an opposite side of the heat exchanger.

The heat exchanger also has a plurality of passageways 30 formed between the inlet area 26 and the outlet area 28 for the passage of water and air introduced in the inlet area 26. The passageways 30 are preferably formed from metal tubes that do not promote mold, mildew, and bacteria growth. The tubes and hence the passageways may be between 12 and 48 inches long, with a preferred length of 24 inches. The heat exchanger also has spaces or air channels 32 transverse to the passageways 30 for the passage of air or another medium used to cool the conditioned space. The heat exchanger may be an air-to-vapor (ATV) type heat exchanger as illustrated or a liquid-to-vapor (LTV) type heat exchanger.

The pump and nozzle assembly 14 introduces pressurized air and water to the inlet area 26 of the heat exchanger 12 for cooling the heat exchanger. In one embodiment, the pump and nozzle assembly comprises one or more high pressure water nozzles 34 and a water pump 36 for delivering pressurized water to the water nozzles. The water nozzles 34 are preferably positioned close to the heat exchanger 12 and disperse pressurized water across the inlet area. The pump 36 may deliver water to the nozzles at 400-50,000 psi, with an ideal pressure of 1,000-5,000 psi. The number of water nozzles 34 depends on the size of the heat exchanger 12 and the cooling needs of the conditioned space. For most typical applications, ten water nozzles 34 are provided.

The pump and nozzle assembly 14 also comprises one or more high pressure air nozzles 38 and an air pump 40 or other source of pressurized air for delivering pressurized air to the air nozzles. The air nozzles 38 are preferably positioned below the water nozzles 34 and angled upwardly to direct pressurized air into the streams of water provided by the water nozzles 34. This mixes the air and water into a dense mist of microscopic water droplets suspended in air. The air pump 40 may deliver air to the nozzles at 25-1,000 psi, with an ideal pressure of 100-300 psi. As with the water nozzles 34, the number of air nozzles 38 depends on the size of the heat exchanger 12 and the cooling needs of the conditioned space. In one embodiment, ten air nozzles 38 are provided.

The air vent 16 introduces either pressurized or non-pressurized ambient air to the inlet 26 of the heat exchanger 12 for mixing with the mist and evaporating the water in the mist. The air vent 16 may be positioned anywhere on the inlet area 16 side of the heat exchanger 12 and may be connected to duct work, hoses, etc. that draw ambient air from an outside area. The air vent 16 may also be coupled to a motorized damper 42 for regulating the amount of ambient air introduced in the inlet area 26. An optional pressure air blower 17 may be provided to force ambient air into the air vent 16.

The vacuum assembly 18 creates a partial vacuum near the outlet area 28 of the heat exchanger 12 to rapidly draw the mist and ambient air through the passageways 30 and out of the enclosure 24. As the mist and ambient air is drawn through the heat exchanger 12, the ambient air evaporates the water suspended in the mist to remove heat from the heat exchanger 12 through evaporative cooling.

In one embodiment, the vacuum assembly 18 comprises one or more fans, blowers, etc., that are connected to discharge ports 44 or vents near the outlet area of the heat exchanger. The fans, blowers, etc. are driven by one or more motors 46. The motor or motors 46 may be multi-speed or variable speed motors so that the control system 22 may select the optimum level of vacuum pressure for a given cooling load and current ambient temperatures and humidity. Applicant has discovered that a vacuum pressure of 0.01 to 15 inHg is desirable for most applications, with a vacuum pressure nearer the lower range for low cooling requirements and nearer the higher range for higher cooling requirements.

A vacuum equalizer plate 47 with a plurality of equally-sized and spaced openings may be positioned between the vacuum discharge ports 44 and the outlet area 28 of the heat exchanger 12 to equalize the vacuum pressure across all the heat exchanger passageways 30. A moisture extractor 48 may be positioned below the vacuum equalizer plate 47 to extract moisture from the air pulled through the heat exchanger and to direct the moisture back to the inlet area 26 of the heat exchanger to reduce the water requirements of the air conditioner system.

A condensation reservoir or sump may be provided in the bottom of the enclosure 24 for collecting water condensation from the inlet area 26 and re-introducing the water to the pump 36.

The transfer mechanism 20 moves air, liquid, or other medium through the passageways 32 of the heat exchanger 12 without permitting the air or other medium to mix with the mist drawn through the passageways 30 of the heat exchanger. This removes heat from the air passing over the heat exchanger without adding humidity to the air. The transfer mechanism 20 may be a blower, fan, pump, or any other similar mechanism and may be driven by one or more motors 50.

The control system 22 operates the other components of the air conditioner system 10 to optimize the performance and efficiency of the system. An embodiment of the control system may include a controller 52, one or more external sensors 54, one or more internal sensors 56, a user interface 58, and circuitry 60 coupled with the pumps and motors 36, 40, 42, 46, 50.

The controller 52 may be a microcontroller, application specific integrated circuit (ASIC), computer, or any other computing device or control circuit capable of implementing logical functions. The controller 52 may be pre-programmed at the factory to operate the air conditioner system in a particular manner based on data received form the external sensors 54 and internal sensors 56 or may be user-configured with the user interface 58.

The external sensors 54 may comprise a thermostat, humidity sensor, enthalpy and/or other environmental sensors for sensing outside ambient temperatures and humidity levels. Likewise, the internal sensors 56 may comprise a thermostat, humidity sensor, and/or other environmental sensors for sensing temperatures and humidity levels inside the conditioned space. The user interface 58 may include any combination of buttons, switches, keypads, touchscreen displays, etc. and may be incorporated in the controller 52 or be a stand-alone device.

The circuitry 60 may include relays, switches, variable speed drives, or other components capable of controlling the pumps 36, 40 connected to the water nozzles 34 and air nozzles 38 and the motors 42, 46, 48 connected to the air vent 16, the optional forced air blower, the vacuum 18, and the transfer mechanism 20. The circuitry 60 communicates with and is controlled by the controller 52.

In one embodiment, the controller 52 receives data representative of an ambient outside temperature and humidity level from the external sensors 54, data representative of an inside temperature and humidity level from the internal sensors 56, and a desired set point temperature and/or humidity level from the user interface 58, and then controls operation of the air conditioner to achieve optimum cooling and efficiency based on this data. In some embodiments, the control system may operate the air conditioner in a number of stages. For example, when the outside environment is extremely hot and/or humid and a user has called for a low inside temperature, the controller 52 may: (1) operate the motors 46, 50 at full speed to provide maximum vacuum and/or blower pressure at the outlet area 28 of the heat exchanger and maximum air speed across the heat exchanger; (2) open the vents 16 completely to provide a maximum amount of ambient air at the inlet of the heat exchanger; (3) operate the air pumps 40 at maximum speed to provide maximum air pressure to the air nozzles 38; and (4) operate the water pumps 36 at full speed to provide maximum water pressure at the water nozzles 34. This creates maximum cooling of the heat exchanger 12 until a desired set point temperature is reached within the conditioned space.

In contrast, when the outside environment is less hot and/or humid, the controller 52 may: (1) operate the motors 46, 50 at a lower speed to provide less vacuum and/or blower pressure at the outlet of the heat exchanger and a lower air speed across the heat exchanger; (2) open the vents 16 only partially to provide less ambient air at the inlet of the heat exchanger; (3) operate the air pumps at a reduced speed to provide a lower air pressure to the air nozzles 38; and (4) operate the water pumps at a reduced speed to provide less water pressure at the water nozzles. This creates a lower rate of cooling of the heat exchanger until a desired set point temperature is reached within the conditioned space.

In another embodiment, the control system 22 operates the air conditioner system 10 in a first stage when ambient temperatures are below a threshold temperature and a second stage when ambient temperatures are above the threshold temperature. The control system 22 activates the high pressure air nozzle in the second stage but not in the first stage.

In another embodiment, the control system operates the air conditioner in four stages, including: $1^{st}$ stage—low pressure (variable) water, low speed (variable) vacuum and/or blower; $2^{nd}$ stage—medium pressure (variable) water, medium speed (variable) vacuum and/or blower; $3^{rd}$ stage—high pressure (variable) water, high pressure (variable) vacuum and/or blower; and $4^{th}$ stage—high pressure (variable) water, high pressure (variable) vacuum and/or blower, compressed air.

An evaporative air conditioner system 100 constructed in accordance with another embodiment of the invention will now be described with reference to FIGS. 3-9. The air conditioner system 100 employs liquid-to-vapor (LTV) heat exchanger technology so that it can be self-contained or used in a zoned air conditioning application. An embodiment of the air conditioner system 100 broadly comprises a heat exchanger 102, an intermixing assembly 104, an air vent 106, an optional pressure air blower and/or a vacuum assembly 108, and a control system.

Figure 4:
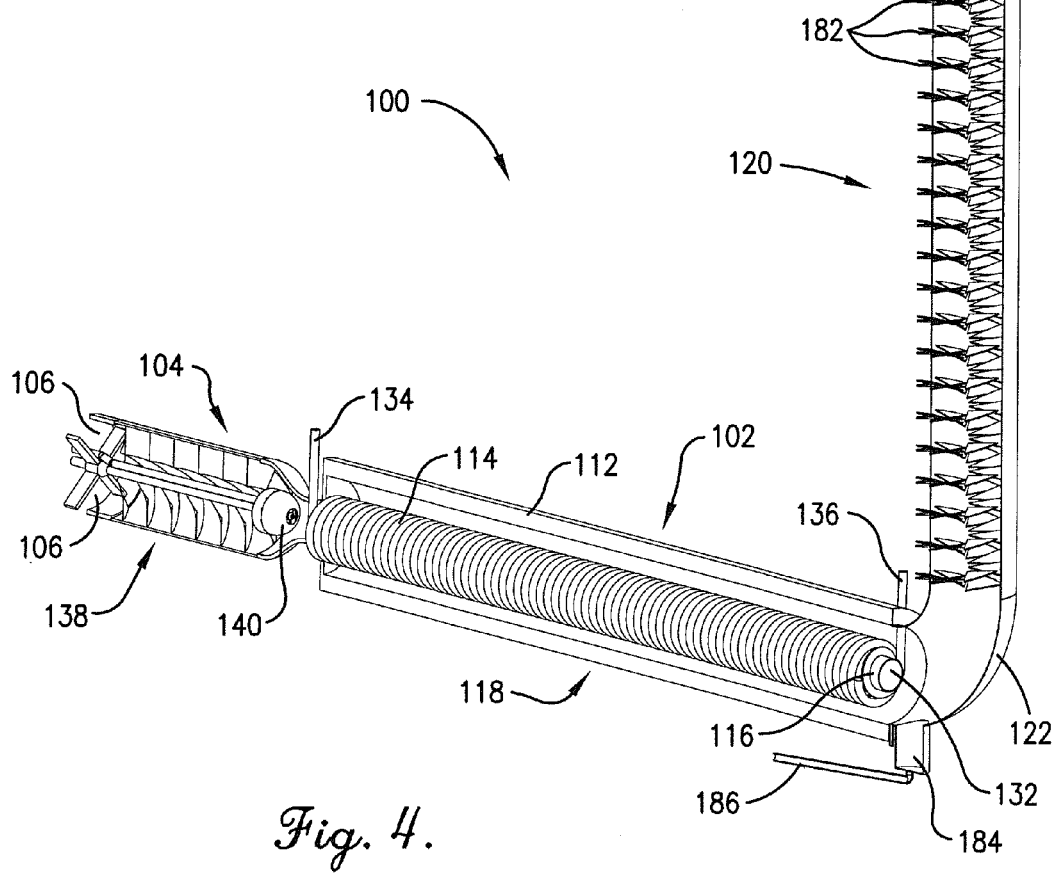
FIG. 4 is a vertical sectional view of the heat exchanger assembly of FIG. 3.
Figure 5:
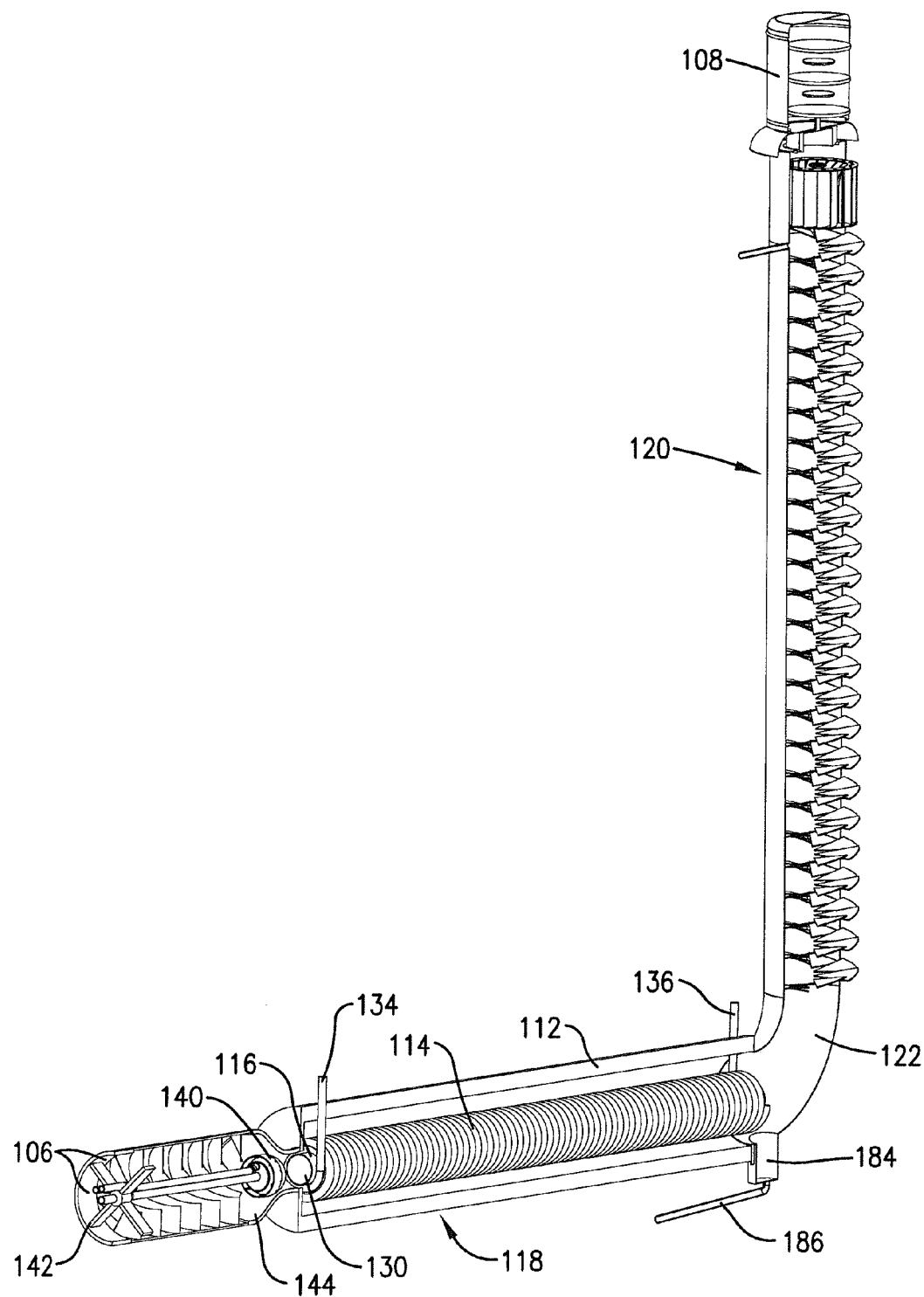
FIG. 5 is another vertical sectional view of the heat exchanger assembly of FIG. 3.

The heat exchanger 102 removes heat from a liquid or other cooling medium which is then pumped to an internal heat exchanger and/or one or more remote heat exchangers to remove heat from air delivered to one or more zones of a conditioned space. An embodiment of the heat exchanger 102 is best illustrated in FIGS. 4-6 and comprises a generally hollow housing 112 and a heat transfer coil 114 supported on a perforated support tube 116 positioned in the housing.

An embodiment of the housing 112 is generally J-shaped or L-shaped and has a generally circular cross section. The housing has a first generally horizontally-extending section 118, a second generally vertically-extending section 120, and an adjoining elbow section 122. In some embodiments, the first housing section 118 includes an inner wall for enclosing the perforated support tube 116 and the heat transfer coil 114 and an outer wall spaced from and encircling the inner wall to provide an insulative air gap between the inner wall and outer wall.

The housing 112 may be constructed of any suitable materials such as metal, plastic, or composites and may be of various sizes to accommodate various different cooling levels. In one embodiment, the first housing section 118 is 12 to 72 inches long and has a diameter of 6 to 20 inches, and the second housing section 120 is 12 to 72 inches long and has a diameter of 6 to 20 inches.

Figure 6:
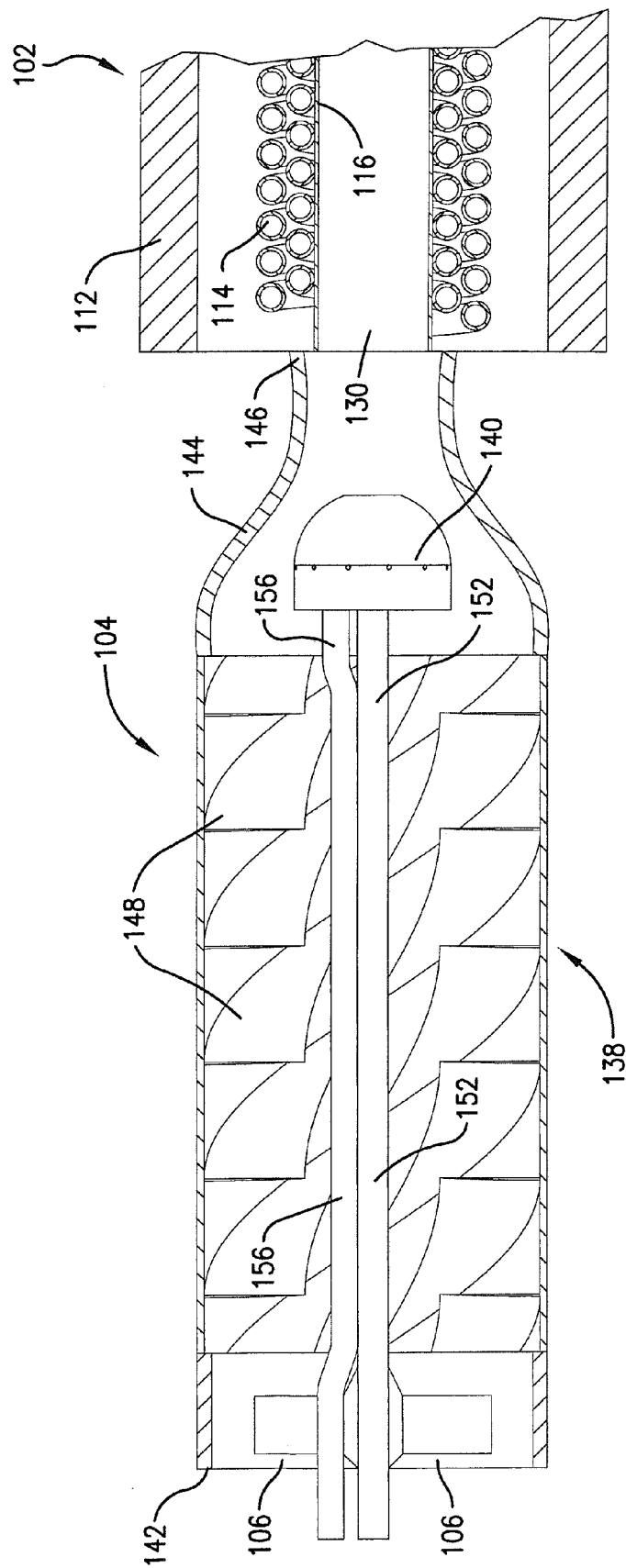
FIG. 6 is a vertical sectional view of the intermixing assembly and a portion of the heat exchanger.

The perforated support tube 116 is positioned primarily in the first housing section 118 and, as best illustrated in FIG. 6, has an inlet 130 aligned with the intermixing assembly 104. The support tube 116 has a series of holes spaced along its length for expelling the water and air received from the intermixing assembly 104 and a capped or otherwise closed end 132 (see FIG. 4) adjacent the elbow 122 to force the water and air out the holes.

The support tube 116 may be formed of any suitable materials and may be of various sizes. In one embodiment, the support tube 116 is formed from a metal or plastic pipe that is 12 to 72 inches long and 2 to 20 inches in diameter and that has approximately 100 to 10,000 perforated holes of $3/32$ to $1/2$ inches diameter each.

The heat transfer coil 114 is wound around the perforated support tube 116 and carries a liquid or other medium to be cooled by the heat exchanger 102. An embodiment of the heat transfer coil 114 is in the shape of a cylindrical helix and is formed from aluminum or other metal tubing that is 36 to 500 inches long when not wound on the support tube 116 and $1/4$ to 1 inch in diameter.

Figure 3:
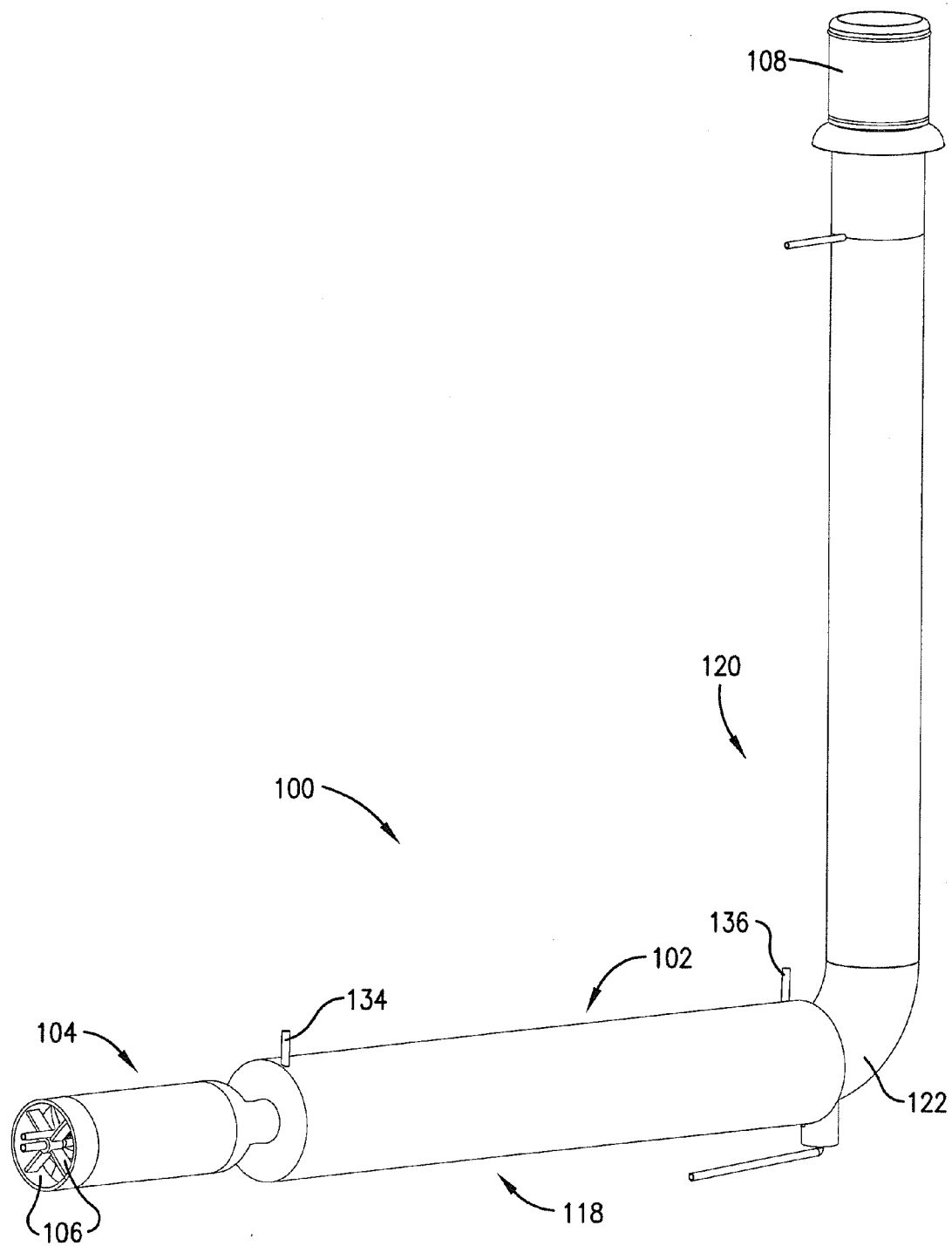
FIG. 3 is a perspective view of components of an air conditioner system constructed in accordance with another embodiment of the invention.

As best shown in FIGS. 3 and 4, the heat transfer coil 114 has an inlet 134 that serves as a fluid return for receiving warm water or other medium that has already been used to cool one or more remote heat exchangers in the air conditioner system. The heat transfer coil 114 also has an outlet 136 that delivers chilled water or other medium to the remote heat exchangers. The air conditioner system may also include various pumps, valves, tanks, and piping connected to the heat transfer coil 114 for distributing the cooling medium to and from the remote heat exchangers.

The intermixing assembly 104 will now be described in more detail with reference primarily to FIG. 6. The intermixing assembly 104 supplies water and air to the heat exchanger 102 to cool the heat transfer coil 114 through evaporative cooling and broadly comprises a housing 138 and a nozzle 140 positioned in the housing. The housing 138 may be constructed of any suitable materials such as metal, plastic, or composites and may be of various shapes and sizes. One embodiment of the housing 138 is tubular and is between 8 and 48 inches long and 4 and 14 in diameter.

The housing 138 has a first end 142 that may define the air vent 106 and a second end with an inwardly tapered neck 144 that defines an outlet 146 for coupling with the inlet 130 of the perforated support tube 116. The reduced diameter neck 144, in combination with the vacuum assembly 108 described below, creates a pressurized vortex region near the outlet 146 of the intermixing assembly that aids in the mixing of the air and water flowing through the intermixing assembly. A plurality of spiral vanes 148 may be positioned along the length of the housing 138 for creating turbulence in the ambient air as it passes through the housing 138 to further aid in the mixing of the air and water.

The nozzle 140 is positioned in the reduced diameter neck 144 of the housing 138 and dispenses pressurized water and air that is mixed with the ambient air from the vent 106. As best illustrated in FIG. 9, the nozzle 140 has a first inlet 150 for connecting to a tube or pipe 152 that is in turn connected to a water pump or other source of pressurized water; a second inlet 154 for connecting to a tube or pipe 156 that is in turn connected to an air pump or other source of pressurized air; and an outlet 158 for dispensing the pressurized water and the pressurized air to the outlet 146 of the intermixing assembly.

Figure 7:
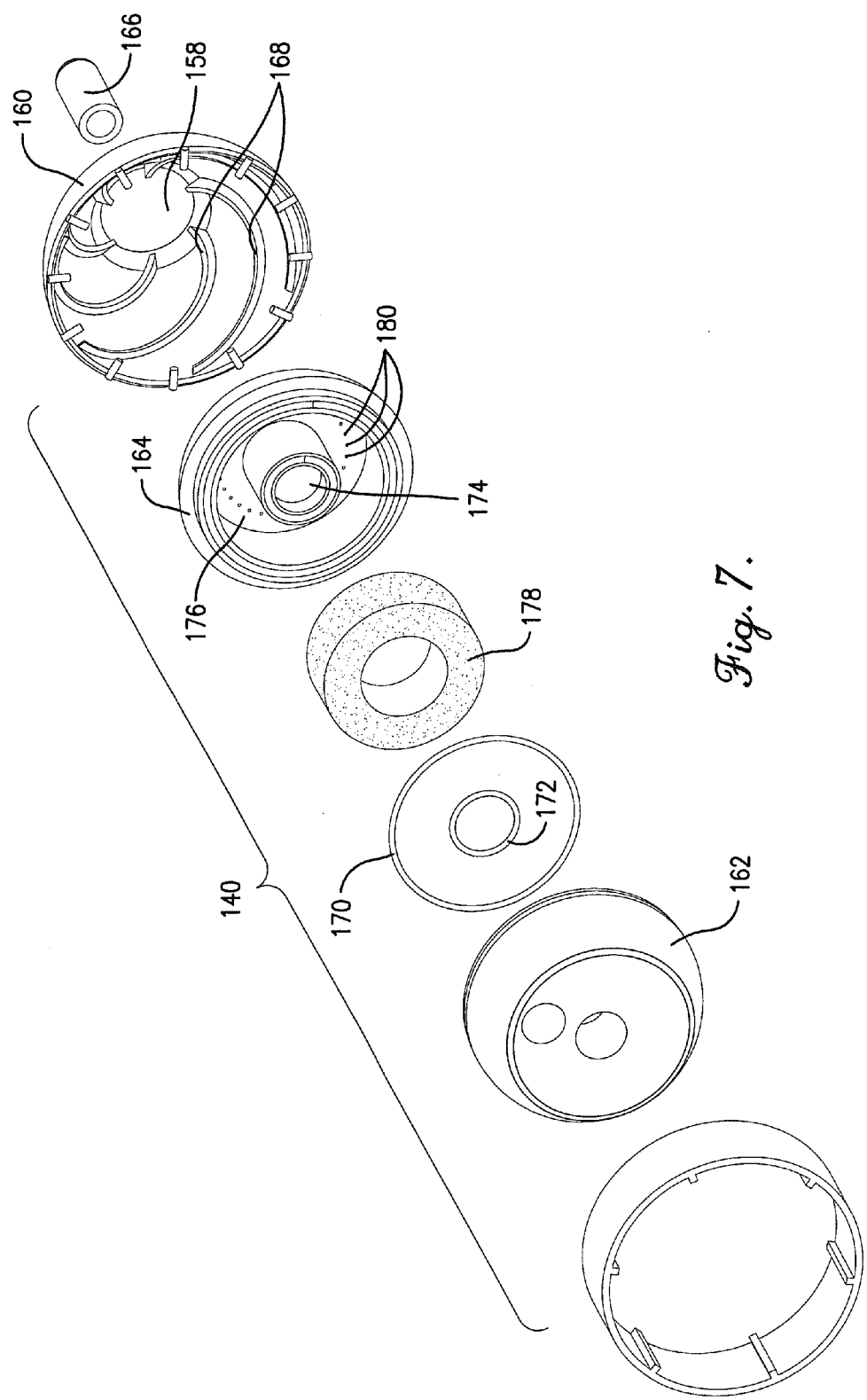
FIG. 7 is an exploded view of the nozzle in the intermixing assembly.
Figure 8:
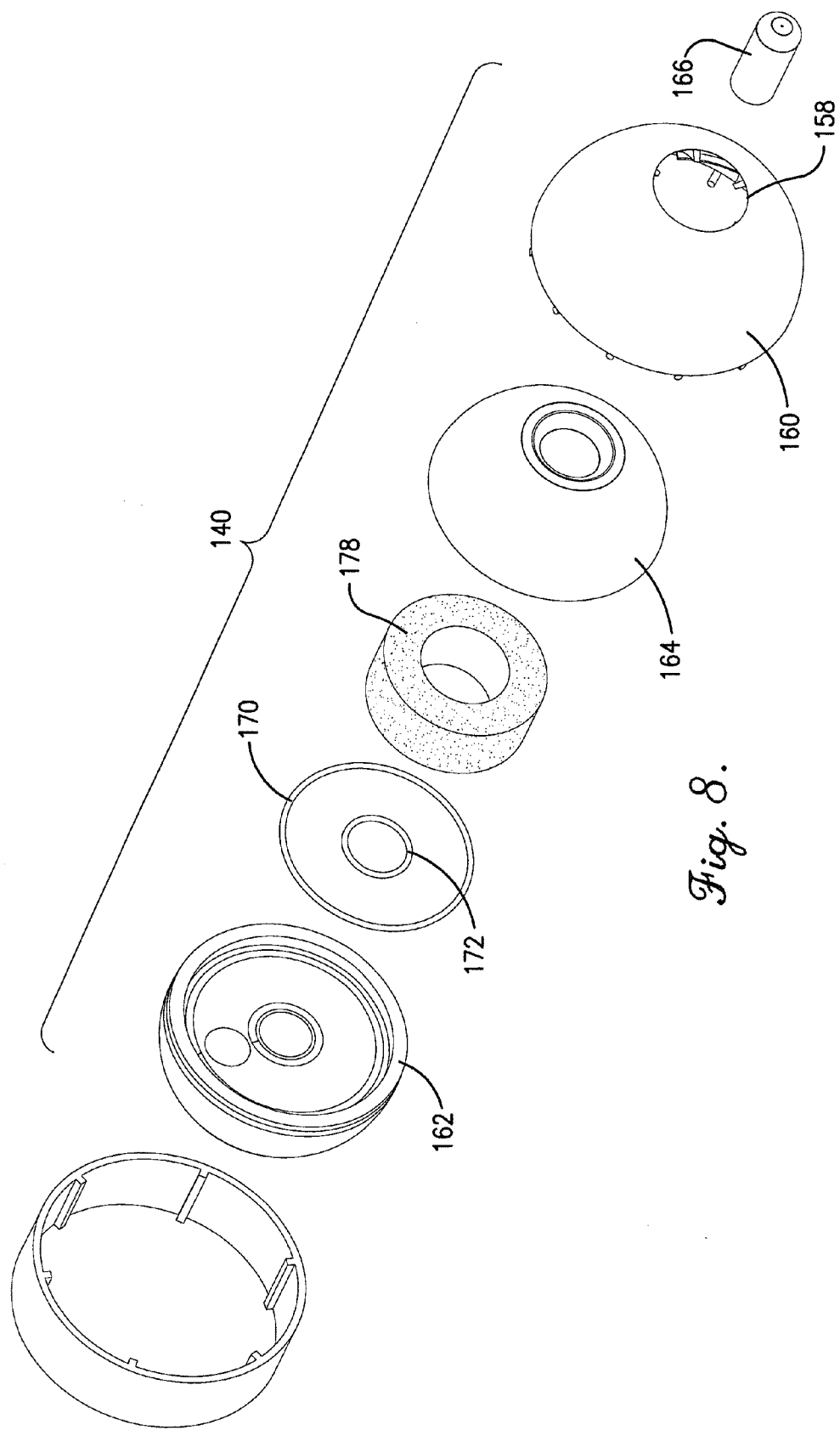
FIG. 8 is another exploded view of the nozzle.

An exploded view of the nozzle 140 is shown in FIGS. 7 and 8. As shown, the nozzle 140 includes mating front and rear caps 160, 162, an air distributor ring 164 sandwiched between the caps, and a water nozzle or sprayer 166 extending through the outlet 158 in the front cap. The components of the nozzle may be constructed of any suitable materials such as hardened plastic or metal.

The front cap 160 is dome-shaped and has an opening that defines the outlet 158 of the nozzle. The inside wall of the front cap also has a number of vanes 168 to create turbulence in the pressurized air flowing through the nozzle.

The rear cap 162 is attached to the front cap 160 as best shown in FIG. 9 and includes openings for passage of the tubes 152, 156 as best shown in FIG. 7. The rear cap 162 also has several annular slots for receiving several sealing O-rings 170, 172.

The air distributor ring 164 fits between the front and rear caps 160, 162 and has a central passageway 174 through which the water tube 152 extends. The air distributor ring 164 also has an annular chamber 176 that receives and supports an air filter 178. A plurality of air holes 180 are formed in one wall of the chamber 176 for dispensing air around the water nozzle 166 as described below.

The water nozzle or sprayer 166 is attached to the water tube 152 and dispenses water out of the nozzle through the outlet 158 in the front cap 160. The water nozzle 152 is positioned inside the air holes 180 so that the nozzle assembly dispenses a central stream of pressurized water surrounded by a concentric stream of pressurized air. The inward taper of the front cap 160 directs the pressurized air toward the center of the nozzle so that the air stream intersects the water stream about $1/16$-2 inches in front of the water nozzle. The pressurized air then mixes with the ambient air and the pressurized water to form a dense mist of water droplets suspended in air in the vicinity of the outlet 146 of the intermixing assembly. This dense mist allows for more effective evaporative cooling as described herein.

One or more pumps, valves, etc. deliver water to the nozzle 166 at 400-50,000 psi, with an ideal pressure of 1,000-5,000 psi. Likewise, one or more air pumps, valve, etc. deliver air to the annular air chamber 176 at 25-1,000 psi, with an ideal pressure of 100-300 psi.

Figure 3A:
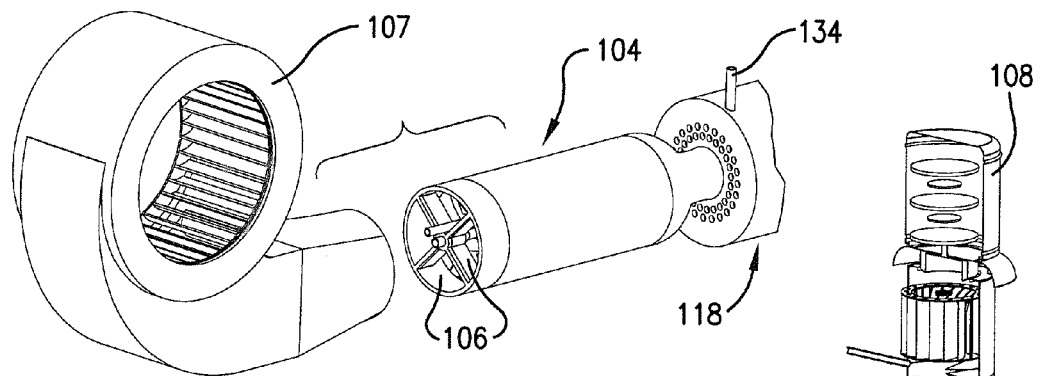
FIG. 3a is a fragmentary perspective view of selected components of another embodiment of the air conditioner system.

The air vent 106 introduces either pressurized or non-pressurized ambient air to the intermixing assembly 104. The air vent is shown in the first end of the intermixing assembly housing 138 but may be positioned anywhere and may be connected to duct work, hoses, etc. that draw ambient air from an outside area. The air vent 106 may also be coupled to a motorized damper for regulating the amount of ambient air introduced in the inlet area. An air blower 107 may provide pressurized air to the air vent 106 as shown in FIG. 3a to increase the flow of ambient air through the intermixing assembly and for forcing the ambient air and mist through the heat exchanger.

The vacuum assembly 108 is coupled with the upper open end of the second housing section 120 and creates a partial vacuum in the heat exchanger. This rapidly draws the mist and ambient air from the intermixing assembly 140 into the inlet 130 of the perforated support tube 116, through and out the support tube, over the heat transfer coil 114, and through the second housing section 120. As the mist and ambient air is rapidly drawn or forced through the heat exchanger under vacuum pressure, the ambient air evaporates the water suspended in the mist to remove heat from the heat transfer coil through evaporative cooling.

In one embodiment, the vacuum assembly 108 comprises one or more fans, blowers, etc., that are connected to the open end of the second housing section. The fans, blowers, etc. may be driven by one or more multi-speed or variable speed motors so that the control system may select the optimum level of vacuum or pressure for a given cooling load and current ambient temperatures and humidity. Applicant has discovered that a vacuum pressure of 0.01 to 15 inHg is desirable for most applications, with a vacuum pressure nearer the lower range for low cooling requirements and nearer the higher range for higher cooling requirements.

A vacuum equalizer plate with a plurality of equally-sized and spaced openings may be positioned below the vacuum to equalize the vacuum pressure across the second housing section. A plurality of moisture extractors 182 are positioned primarily in the second section of the housing and are operable to extract water from the air before it is discharged from the second housing section. Water in the air that is not evaporated in the first housing section condenses on the bottom surfaces of the moisture extractors and drips into the elbow section 122 of the housing.

As best shown in FIGS. 4 and 5, a condensation reservoir 184 may be positioned in the elbow 122 for collecting water that condenses from the air passing through the second housing. Piping 186 and a pump connected with the condensation reservoir 184 may then pump the condensed water back to the nozzle 140 to reduce the water requirements of the nozzle. The control system may operate the pump whenever the reservoir 184 is full. When the pump for the reservoir 184 is being operated, the control system may shut down other water pumps feeding pressurized water to the nozzle 140.

An embodiment of the control system may be substantially identical to the control system illustrated in FIG. 2 and is therefore not described in detail again. The control system optimizes the performance and efficiency of the heat exchanger and intermixing assembly and matches their operation to a desired cooling level or load.

In one embodiment, the control system receives data representative of an ambient outside temperature and humidity level from external sensors such as an enthalpy sensor, data representative of an inside temperature and humidity level from internal sensors, and a desired set point temperature and/or humidity level from a user interface, and then controls operation of the air conditioner 100 to achieve optimum cooling and efficiency based on this data. For example, when the outside environment is extremely hot and/or humid and a user has called for a low inside temperature, the control system may: (1) provide maximum vacuum and/or blower pressure; (2) provide a maximum amount of ambient air at the inlet of the heat exchanger; (3) provide maximum air pressure to the nozzle; and (4) provide maximum water pressure to the nozzle. This creates maximum cooling of the heat exchanger 102 until a desired set point temperature is reached within the conditioned space.

The above described evaporative air conditioner systems 10, 100 provides numerous advantages over existing air conditioner systems. For example, the air conditioners 10, 100 do not introduce excessive humidity into a conditioned space; are not susceptible to mold, mildew, and/or bacteria growth; and do not introduce excessive outdoor air into the conditioned space. The air conditioner systems also allow the conditioned air to be recirculated from within the conditioned space and filtered, purified, sterilized, humidified, and/or zoned.

The air conditioners are also more efficient and effective than existing indirect evaporative air conditioning systems. For example, the air conditioning systems create a dense atomized mist that can be evaporated more quickly than water soaked in evaporative pads. Also, by rapidly drawing the mist through the heat exchangers under vacuum pressure, a large volume of the mist quickly evaporates to rapidly remove heat from the heat exchangers at a significantly faster rate than evaporation in conventional evaporative type air conditioners.

FIGS. 10-14 illustrate a nozzle 200 constructed in accordance with an alternative embodiment of the invention. As with the first embodiment of the nozzle 140, the nozzle 200 may be positioned in the reduced diameter neck 144 of the housing 138 shown in FIG. 6 and dispenses pressurized water and air that is mixed with ambient air to form a dense mist of water droplets for use in cooling the heat exchanger.

Figure 12:
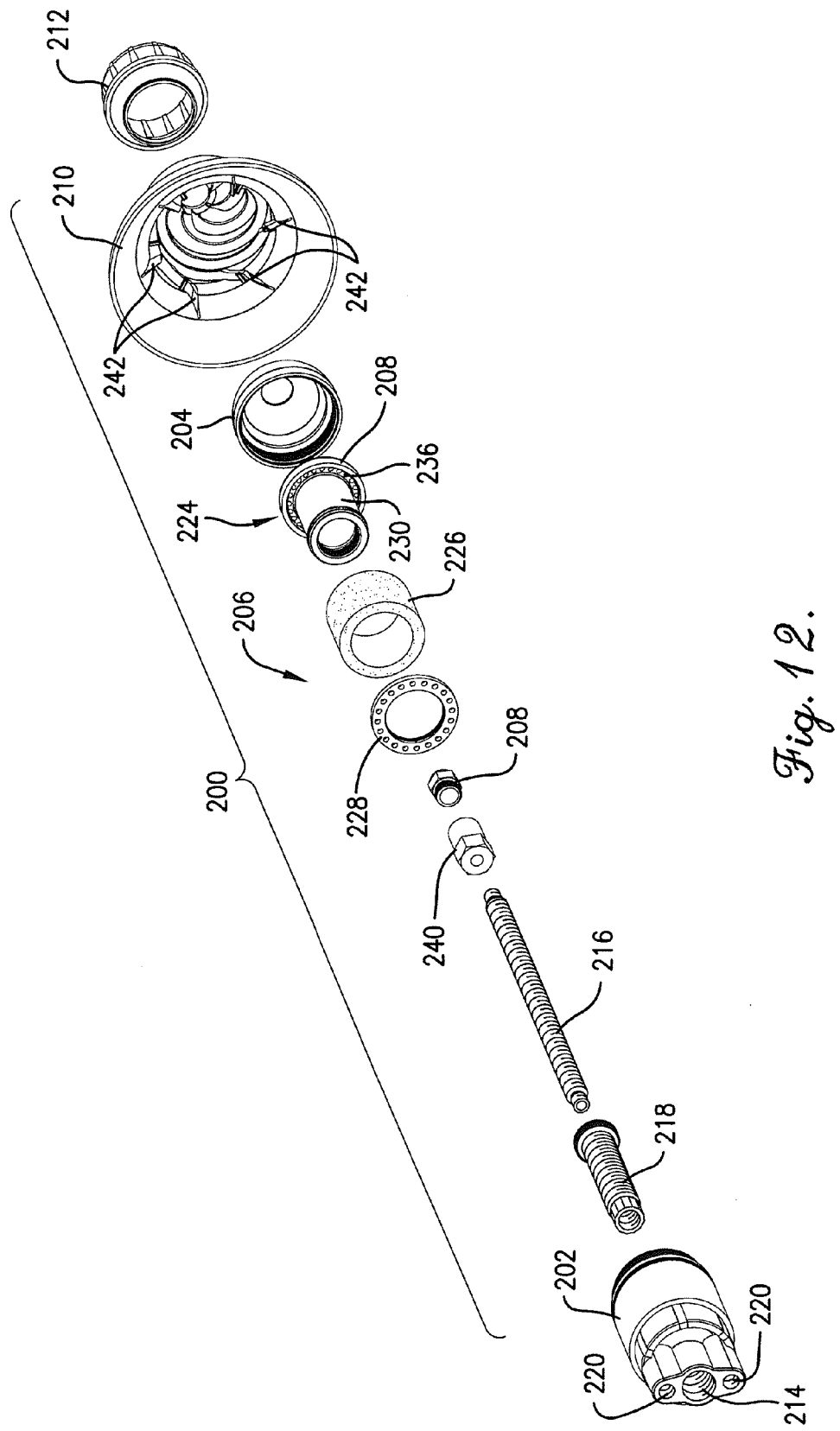
FIG. 12 is an exploded rear perspective view of the nozzle of FIG. 10.
Figure 13:
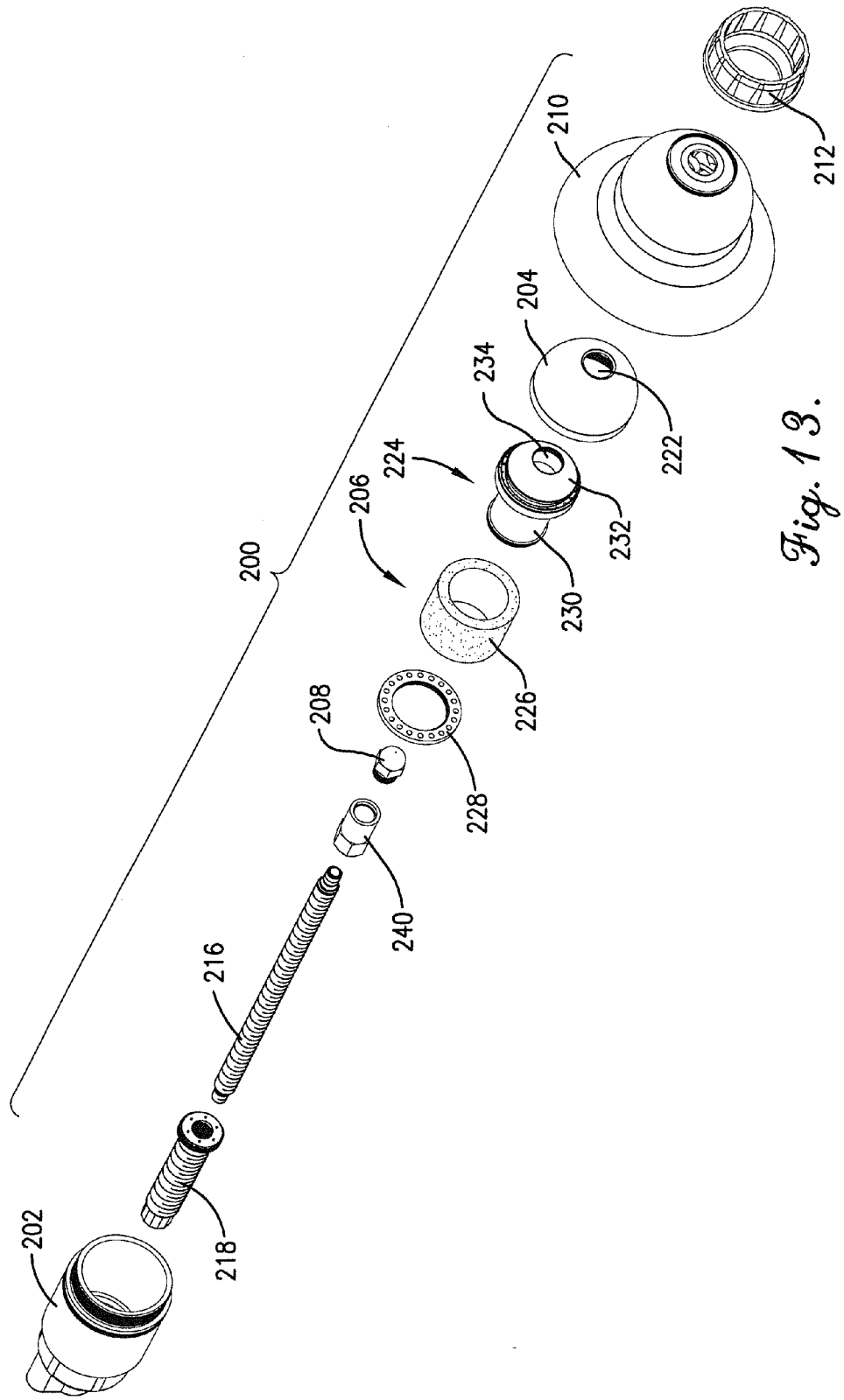
FIG. 13 is an exploded front perspective view of the nozzle of FIG. 10.

As best illustrated in the exploded views of FIGS. 12 and 13, an embodiment of the nozzle 200 broadly includes a rear plug 202, a front cap 204, an air diffuser and filter assembly 206, a water nozzle 208, an air shroud 210, and a mist nozzle 212. The components of the nozzle 200 may be constructed of any suitable materials and may be of any shape and size without departing from the scope of the present invention.

Figure 14:
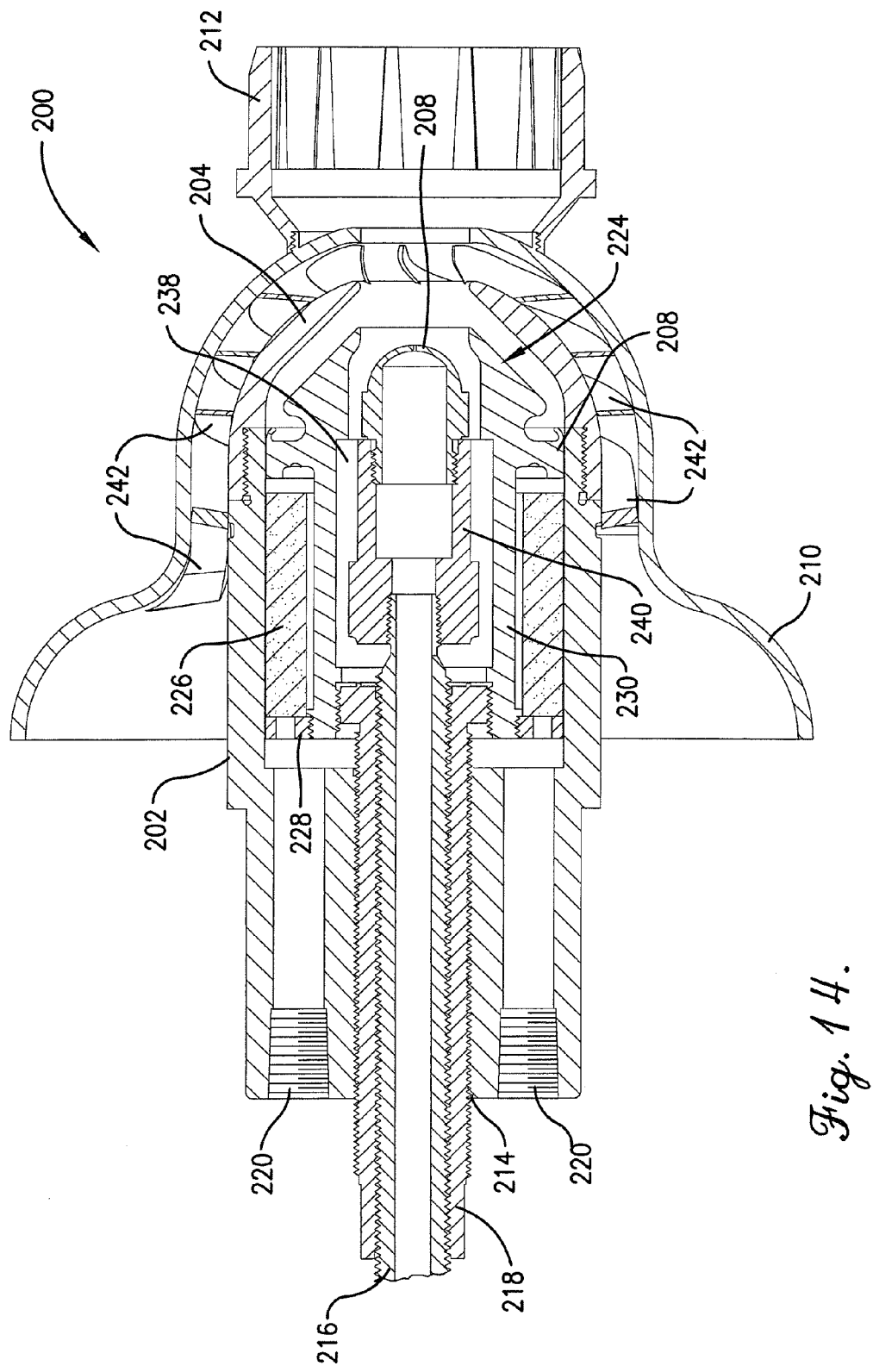
FIG. 14 is a vertical sectional view of the nozzle of FIG. 10.

The rear plug 202 forms the back-end of the nozzle 200 and includes an internally, threaded inlet 214 for receiving a tube or pipe 216 that is in turn connected to a water pump or other source of pressurized water. An internally and externally threaded nipple 218 may be screwed in the inlet 214, and the water tube 216 may in turn be screwed on the nipple as best shown in FIG. 14. The rear plug 202 also includes a pair of internally threaded inlets 220 for connecting to air tubes that are in turn connected to an air pump or other source of pressurized air. The front edge of the rear plug 202 has external threads for engaging and mating with threads in the front cap 204 as described in more detail below.

The front cap 204 is dome-shaped and has an opening 222 that defines an outlet for dispensing pressurized water and pressurized air as described below. The inside wall of the front cap 204 may have ridges or vanes to create turbulence in the pressurized air flowing through the cap. The rear side of the front cap 204 has internal threads that engage the external threads on the rear plug 202 for securing the plug 202 and cap 204 together. O-rings or other seals may be sandwiched between the plug 202 and cap 204.

The air diffuser and filter assembly 206 is sandwiched between the rear plug 202 and the front cap 204 and is provided for filtering the pressurized air and delivering it to the outlet of the nozzle 200. An embodiment of the air diffuser and filter assembly 206 includes an air nozzle 224, an air filter 226, and a ring-shaped air diffuser 228.

The air nozzle 224 includes a rearwardly extending barrel 230 for supporting the filter 226 and a dome-shaped front 232 with an opening 234 aligned with the opening 222 in the front cap 204. The rearmost outer surface of the barrel 230 has external threads for mating with threads in the air diffuser 228. The air nozzle also has a ring-shaped inner wall 236 with a plurality of air holes formed therein and a central passageway 238 in which the water nozzle is received.

The air filter 226 fits over the barrel 230 on the air nozzle 224 and filters the pressurized air before it is emitted from the air nozzle 224. An embodiment of the filter is cylindrical, but it may be of any shape and size.

The ring-shaped air diffuser 228 holds the filter 226 on the barrel 230 of the air nozzle 224 and passes air from the inlets 220 to the filter 226. The inner wall of the air diffuser 228 is threaded so that it may be screwed over the end of the barrel 230 to hold the air filter in place on the air nozzle 224. The air diffuser 228 has a plurality of air holes formed therein for passing air from the inlets 220 through the filter 226 and out the opening 234 in the air nozzle 224.

The water nozzle 208 or sprayer is attached to the water tube 216 by an adaptor 240. The nozzle is positioned within the passageway 238 of the air nozzle 224 and is aligned with the opening 234 of the air nozzle as well as the opening 222 of the front cap 204 for spraying pressurized water out of the cap as best illustrated in FIG. 14.

The air shroud 210 is positioned over and extends radially outwardly from the rear plug 202 and front cap 204 and is provided for introducing ambient air to the nozzle 200. The rear of the shroud is open and flares out for receiving ambient air, and the inner wall of the shroud includes vanes 242 for creating turbulence in the ambient air.

The mist nozzle 212 is attached to the front of the shroud 210 and is provided for concentrating the pressurized water, pressurized air, and ambient air into one central stream. In one embodiment, the mist nozzle attaches to the shroud 210 internal threads that engage external threads on the air shroud.

The nozzle 200 functions as follows. The water nozzle 208 receives pressurized water from the tube or pipe 216 and dispenses it out of the opening 234 in the air nozzle 224. The air nozzle 224 receives pressurized air from the inlets 220 and dispenses the air through the holes in its inner wall 236. The water nozzle 208 is positioned inside the air holes in the air nozzle 224 so that the water nozzle and air nozzle together dispense a central stream of pressurized water surrounded by a concentric stream of pressurized air. The inward taper of the front cap 204 directs the pressurized air toward the center of the nozzle so that the air stream intersects the water stream in front of the water nozzle 208. The shroud 210 then delivers ambient air to be mixed with the pressurized water and pressurized air. The pressurized air, ambient air, and the pressurized water form a dense mist of water droplets suspended in air near the outlet of the nozzle. The mist nozzle 212 then concentrates and directs the mist into the intermixing assembly described above. This dense mist allows for more effective evaporative cooling as described herein.

Although the invention has been described with reference to the preferred embodiment illustrated in the attached drawing figures, it is noted that equivalents may be employed and substitutions made herein without departing from the scope of the invention as recited in the claims. For example, the specific components of the air conditioner system 10 described and illustrated herein may be replaced and/or supplemented with equivalent components.

Having thus described the preferred embodiment of the invention, what is claimed is as new desired to be protected by Letters Patent includes the following:

1. An intermixing assembly for coupling with a heat exchanger of an evaporative air conditioner, the intermixing assembly comprising:
   an elongated housing with an inlet for receiving ambient air from a source thereof and an outlet for coupling with the heat exchanger;
   a plurality of spiral vanes positioned within the housing for creating turbulence in the ambient air as it passes through the housing; and
   a nozzle positioned adjacent the housing outlet, the nozzle having—
      a first inlet for connecting to a source of pressurized water;
      a second inlet for connecting to a source of pressurized air; and
      an outlet for dispensing the pressurized water and pressurized air and mixing them with the ambient air to form a mist near the housing outlet for delivery to the heat exchanger.

2. The intermixing assembly of claim 1, wherein the nozzle discharges the pressurized water out of a central area of the nozzle.

3. The intermixing assembly of claim 2, wherein the nozzle discharges the pressurized air around the pressurized water.

4. The intermixing assembly of claim 3, further comprising a plurality of vanes positioned in the nozzle for creating turbulence in the pressurized air as it passes through the nozzle.

5. The intermixing assembly of claim 3, wherein the housing is generally circular in cross section.

6. The intermixing assembly of claim 3, wherein the housing outlet has an inwardly tapered neck.

7. The intermixing assembly of claim 1, further comprising an air blower for providing pressurized air to the inlet of the elongated housing.

8. An intermixing assembly for coupling with a heat exchanger of an evaporative air conditioner, the intermixing assembly comprising:
   an elongated housing with an inlet for receiving ambient air from a source thereof and an outlet with an inwardly tapered neck for coupling with the heat exchanger;
   a plurality of spiral vanes positioned within the housing for creating turbulence in the ambient air as it passes through the housing; and
   a nozzle positioned adjacent the housing outlet, the nozzle having—
      a first inlet for connecting to a source of pressurized water;
      a second inlet for connecting to a source of pressurized air; and
      an outlet for dispensing the pressurized water near a center of the nozzle and the pressurized air around the dispensed pressurized water to mix the pressurized water, the pressurized air, and the ambient air to form a mist near the housing outlet for delivery to the heat exchanger.

* * * * *